Jan. 9, 1968   R. E. MEYERS   3,362,248
POWER STEERING GEAR FOR MOTOR VEHICLES
Filed June 23, 1965   2 Sheets-Sheet 2

INVENTOR.
ROBERT E. MEYERS
BY
William N. Antonis
ATTORNEY

United States Patent Office 3,362,248
Patented Jan. 9, 1968

3,362,248
POWER STEERING GEAR FOR
MOTOR VEHICLES
Robert E. Meyers, South Bend, Ind., assignor to The Bendix Corporation, South Bend, Ind., a corporation of Delaware
Filed June 23, 1965, Ser. No. 466,357
1 Claim. (Cl. 74—500)

ABSTRACT OF THE DISCLOSURE

A steering gear having an hour-glass worm and a follower. The follower includes a spherical member, for engaging the worm groove, which always provides optimum rolling contact with one of the sides of the groove. The spherical member is supported by a ring of ball bearings.

---

In a steering gear which utilizes an hour-glass worm having a variable or a constant lead groove formed thereon, it is desirable to contact the groove with a follower in such a manner as to obtain optimum rolling contact.

Accordingly, it is an object of this invention to provide a follower for use in connection with an hour-glass worm which will permit optimum rolling contact therebetween.

Another object of this invention is to provide a follower of the type described which is relatively simple and compact.

More particularly, it is an important object of this invention to provide a follower for use in connection with an hour-glass worm which includes a rotatable member for engaging only one of the two sides of the worm groove, except on the center straight ahead position when both sides thereof are engaged, said rotatable member always having an axis of contact at right angles to the helix generated by said groove at any given point on said helix and an axis of rotation perpendicular to said axis of contact.

Another object of this invention is to provide a follower of the type described which includes a spherical member for contacting the worm groove and a ring of bearings for supporting said spherical member, said bearings being arranged so that the actual line of force between the spherical member and the contacting side of the worm groove always passes through the center of the spherical member and lies within a circle passing through the points of contact between the spherical member and the bearings.

A further object of this invention is to provide a follower which includes adjustable means for causing said spherical member to be urged into contact with both sides of said worm groove in the center straight ahead position.

The above and other objects and features of this invention will be apparent from the following description of the mechanism taken in connection with the accompanying drawings which form a part of this specification and in which:

FIGURE 4 is a composite sectional view which shows the passages of the power steering valve moved into the same plane for purposes of more clearly illustrating the flow paths within the valve.

Figure 1:
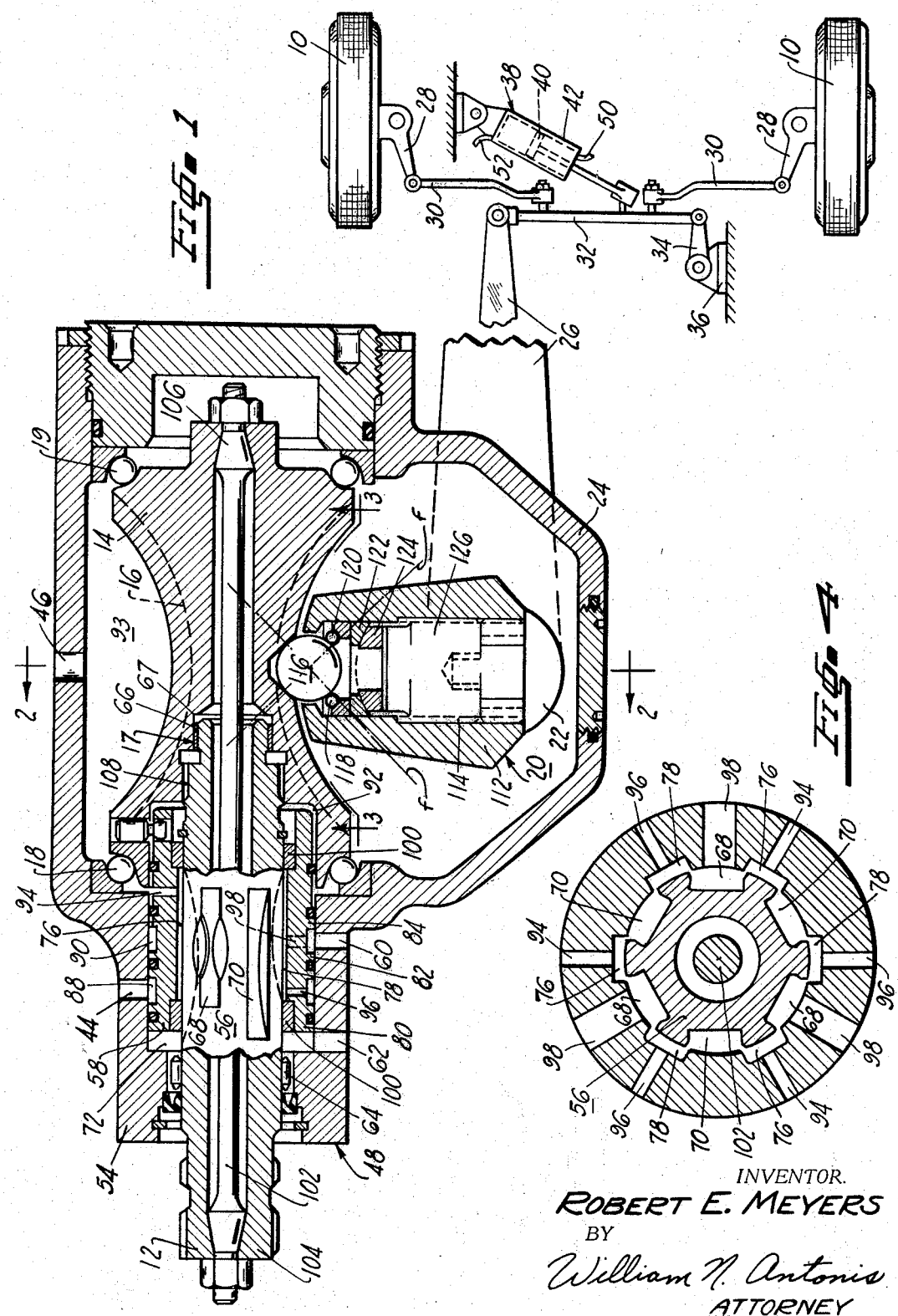
FIGURE 1 is a view partially in section of a power steering mechanism constructed in accordance with the present invention which is shown in association with parts of the vehicle drawn schematically.
Figure 2:
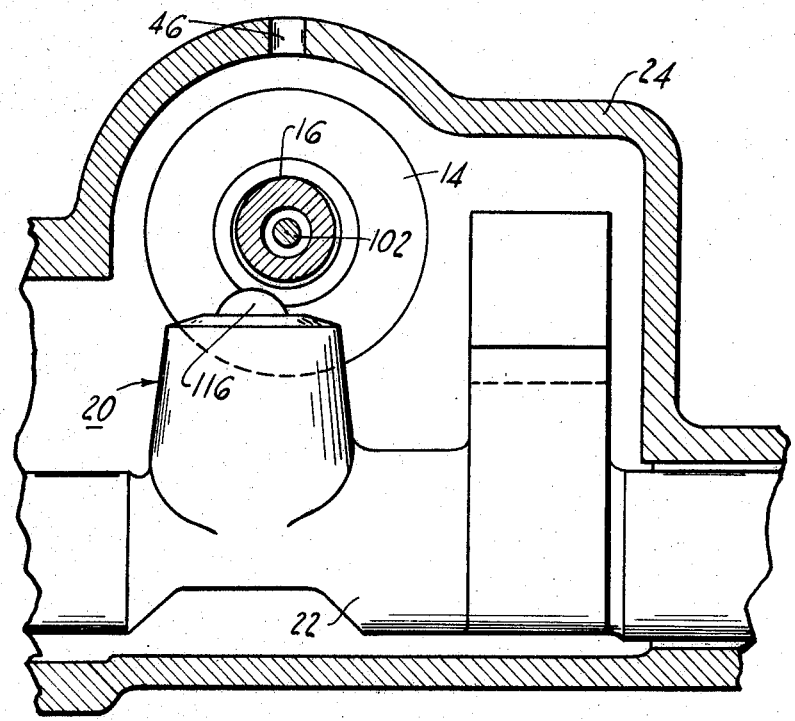
FIGURE 2 is a portion of a sectional view taken substantially along line 2—2 of FIGURE 1.
Figure 3:
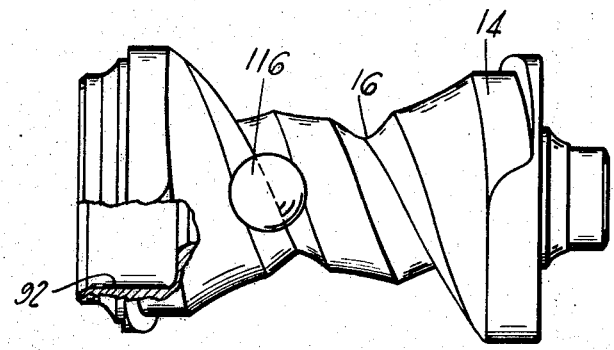
FIGURE 3 is a view taken substantially along line 3—3 of FIGURE 1.

Referring to FIGURE 1, it will be seen that reference numeral 10 designates the front wheels of a vehicle to be steered by rotation of the steering shaft (not shown) which is suitably connected to the input shaft 12. Operatively connected to the input shaft 12 is an hour-glass worm 14 having a groove 16 formed thereon and a stepped diameter bore 17, located within and at one end thereof, which extends substantially to the bottom of the worm groove without interfering therewith, said worm being held against axial displacement by radial thrust bearings 18 and 19 located at each end of the worm. A follower, indicated generally by the numeral 20 and described in more detail hereafter, is arranged to engage the worm groove 16 and is carried by one end of a pitman or sector shaft 22 which is suitably journaled in gear housing 24, said pitman shaft being rockably disposed and offset at substantially right angles to the axis of the worm 14. A pitman arm 26 is connected to the other end of the pitman shaft 22 and to the spindle arms 28 of the wheels 10 through a steering linkage assembly which includes tie rods 30, a cross tie rod 32, and an idler arm 34, suitably pivoted at one end to the vehicle frame 36.

The hydraulic system of the power steering mechanism includes a fluid motor 38 which may be connected between the cross tie rod 32 and the vehicle frame 36, as shown in FIGURE 1. However, the fluid motor may be located at any other suitable position, e.g., integral with the steering gear housing. A piston 40 divides cylinder 42 into opposed chambers constantly communicating respectively with cylinder ports 44 and 46 of rotor valve 48 via conduits 50 and 52.

The main components of the rotary valve 48 are the valve housing 54, the rotor 56 which is formed on the input shaft 12, and the sleeve 58 which is located between the rotor and the valve housing. Located in the housing 54 are inlet port 60, outlet port 62, and the two previously mentioned cylinder ports 44 and 46. It will be noted that the combination input shaft-valve rotor has one end thereof which rotates on the needle roller bearing 64 which is located between the input shaft 12 and the valve housing 54, while the other end thereof extends into the bore portion 67 of stepped diameter bore 17 and rotates on a bronze bearing 66 located between the input shaft and the worm 14. The rotor 56 contains six axially extending equally spaced slots formed on the outer periphery thereof, three of which are pressure slots and are designated by the reference numeral 68 and the other three of which are return slots and are designated by the reference numeral 70. It will be noted that the return slots 70 are longer than the pressure slots 68 so that the return slots may communicate with a return chamber 72 located at one end of sleeve 58.

Located on the inner periphery of valve sleeve 58 are six axially extending equally spaced slots, three of which are designated by the reference numeral 76 and the other three of which are designated by the reference numeral 78. Formed on the outer periphery of valve sleeve 58 are three annular lands 80, 82 and 84, and two annular grooves 88 and 90. Since sleeve 58 extends into the bore portion 92 of stepped diameter bore 17, it is possible to eliminate the fourth annular land and third annular groove, both of which are normally common to rotary valves of this general type, as typified by Davis Patent No. 1,947,973. In view of the arrangement shown, it is possible to communicate steering gear cavity 93 with sleeve slots 76 via radially extending passages 94 without the necessity for utilizing an annular groove on the valve sleeve since radially extending passages 94 open directly into the steering gear cavity. On the other hand, radially extending passages 96 communicate sleeve slots 78 with annular groove 88. Radially extending passages 98 communicate rotor slots 68 with annular groove 90. Thus, it can be seen from the drawing, particularly FIGURE 4, that when the rotary valve 48 which is an open center valve, is in a neutral straight ahead position, flow will occur from inlet port 60 to outlet port 62 via annular groove 90, radially extending sleeve passages 98, axially extending rotor slots 68, axially extending sleeve slots 76 and 78, axially extending rotor slots 70, and return chamber 72. Cylinder port 44 communicates with sleeve slots 76 via radial sleeve passages 96 and annular groove 88, whereas cylinder port 46 communicates with sleeve slots 76 via radial passages 94 and steering gear cavity 93.

Seals are located in annular lands 80, 82 and 84 to prevent leakage thereacross. These seals are glass filled "Teflon" endless sealing rings of rectangular section. Stop-off rings 100 seal off the axially extending sleeve slots 76 and 78 and also serve as bearings.

A torsion bar 102 is suitably attached at one end 104 to the input rotor and at the other end 106 to the worm. A mechanical drive-through spline type connection 108 is provided between the combination input rotor 12, 56 and the worm 14 which will result in a direct mechanical drive between the input shaft and the worm in the event of power failure. At all other times, this connection will permit limited relative rotary motion between the input shaft and the worm. The torsion rod 102, which connects the valve rotor and worm, provides mechanical "feel" without preventing the necessary angular movement required between the sleeve and rotor for valve operation.

The three equally spaced flow paths previously described, give balanced forces within the valve due to fluid flow, thereby eliminating any stickiness due to hydraulic unbalance. Upon rotation of the steering wheel, the valve rotor 56 is rotated relative to the valve sleeve 58 as a result of deflection of the torsion rod 102 which connects the valve rotor and the steering gear worm. This movement is in proportion to the input torque. As can more clearly be seen by reference to FIGURE 4, relative rotation between valve rotor 56 and valve sleeve 58, will cause one of the cylinder ports 44, 46 to communicate with the inlet port 60 and the other cylinder port to communicate with the outlet port 62. This will create a differential pressure across piston 40 and will result in power assisted steering.

The follower, which is indicated generally by the numeral 20, includes a housing 112, having a bore 114 therein, said housing extending from the pitman shaft 22. Located within the bore is a spherical member 116 which engages the worm groove 16, a ring of ball or other suitable bearings 118, angular contact bearing race 120, self-aligning bearings 122 and 124 having spherical contacting surfaces, and an adjustable plug 126 for causing the spherical member to be urged into contact with both sides of the worm groove in the center straight ahead position. This latter type of manual adjustment is commonly referred to as adjusting for high-point. The self-aligning bearings 122 and 124 are utilized to compensate for out-of-squareness of the threaded adjustable plug 126 and threaded bore 114. Alignment will occur only when the adjustable plug is rotated and tightened against the aligning bearings.

By utilizing a spherical rotatable member 116 for engagement with the sides of the constant or variable lead worm groove, it is possible to always have an axis of contact which is at right angles to the helix generated by the groove at any given point along said helix and an axis of rotation perpendicular to said axis of contact. This will provide optimum rolling contact between the spherical member and the contacting side of the groove. It should be understood that, except in the center straight ahead position when the spherical member 116 will be in contact with both sides of the groove, the spherical member will be in contact with one side of the groove upon rotation of the worm in one direction and in contact with the other side of the groove upon rotation of the worm in the other direction. Thus, there is never any variance between the lead angle and the follower angle which is the case when utilizing an annular roller type follower having a fixed angle and a single axis of rotation. In those arrangements where such a variance occurs and the follower axis of rotation is not always at right angles to the axis of contact, undesirable scuffing and sliding will occur. It should also be noted that in order to maintain the spherical member 116 in proper rolling contact with one of the sides of the groove, the ring of ball or other suitable bearings 118, is arranged so that the actual line of force $f$ between the spherical member and the contacting side of the worm groove always passes through the center of the spherical member and lies within a circle passing through the points of contact between the spherical follower member and the ball bearings.

The several practical advantages which flow from this novel inventive combination are believed to be obvious from the foregoing description, and other advantages may suggest themselves to those who are familiar with the art to which the invention relates.

Having thus described the various features of the invention, what I claim as new and desire to secure by Letters Patent is:

1. In a steering gear, the combination of a steering shaft, an hour-glass worm operatively connected to said steering shaft and having a groove formed thereon, a pitman shaft rockably disposed and offset at substantially right angles to the axis of said worm, and a follower extending from said pitman shaft into engagement with said worm to cause rocking of said pitman shaft upon rotation of said worm in either direction, said follower including a rotatable spherical member for engaging only one of the two sides of said worm except on the center straight-ahead position when both sides thereof are engaged, said rotatable spherical member always having an axis of contact at right angles to the helix generated by said group at any given point on said helix and an axis of rotation perpendicular to said axis of contact to thereby obtain optimum rolling contact with one of the sides of said groove, angular contact race means, a ring of ball bearings located between said race means and said spherical member for supporting said spherical member, said bearings being arranged so that the actual line of force between said spherical member and the contacting side of said groove always passes through the center of said spherical member and lies within a circle passing through the points of contact between said spherical member and said bearings, an adjustable plug for causing said spherical member to be urged into contact with both sides of said worm groove in the center straight-ahead position, and self-aligning bearings located between said angular contact race means and said adjustable plug.

References Cited
UNITED STATES PATENTS

| | | | |
|---|---|---|---|
| 2,351,617 | 6/1944 | Katcher | 74—500 |
| 2,448,701 | 9/1948 | Briggs | 74—500 |
| 2,972,261 | 2/1961 | White | 74—500 |
| 3,250,147 | 5/1966 | Barton et al. | 74—424.8 |

MILTON KAUFMAN, *Primary Examiner.*